United States Patent
Han et al.

(10) Patent No.: US 8,792,891 B2
(45) Date of Patent: Jul. 29, 2014

(54) METHOD AND SYSTEM FOR IDENTIFYING A TERMINAL

(75) Inventors: Lifeng Han, Shenzhen (CN); Feng He, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 284 days.

(21) Appl. No.: 13/257,816

(22) PCT Filed: Feb. 5, 2010

(86) PCT No.: PCT/CN2010/070548
§ 371 (c)(1),
(2), (4) Date: Mar. 13, 2012

(87) PCT Pub. No.: WO2011/029292
PCT Pub. Date: Mar. 17, 2011

(65) Prior Publication Data
US 2012/0157156 A1    Jun. 21, 2012

(30) Foreign Application Priority Data
Sep. 14, 2009 (CN) .......................... 2009 1 0176426

(51) Int. Cl.
*H04W 4/00* (2009.01)
*H04W 36/00* (2009.01)
*H04W 76/02* (2009.01)
*H04W 36/08* (2009.01)
*H04W 72/04* (2009.01)
*H04W 28/04* (2009.01)

(52) U.S. Cl.
CPC ............ *H04W 76/028* (2013.01); *H04W 36/08* (2013.01); *H04W 72/0413* (2013.01); *H04W 28/04* (2013.01)
USPC ............ 455/436; 455/439; 455/444; 455/434

(58) Field of Classification Search
CPC .................................................. H04W 36/0055
USPC .......................................... 455/436, 439, 442
See application file for complete search history.

(56) References Cited

U.S. PATENT DOCUMENTS 8,130,719 B2 *   3/2012   Svensson et al. .............. 370/331
8,600,353 B2 *  12/2013   Hultin et al. ................... 455/411
(Continued)

FOREIGN PATENT DOCUMENTS

| CN | 101207905 A | 6/2008 |
| WO | 2008114183 A1 | 9/2008 |

(Continued)

OTHER PUBLICATIONS

International Search Report in international application No. PCT/CN2010/070548, mailed on Jun. 24, 2010.
(Continued)

*Primary Examiner* — Tilahun B Gesesse
(74) *Attorney, Agent, or Firm* — Oppedahl Patent Law Firm LLC

(57) ABSTRACT

The disclosure provides a method and system for identifying a terminal. The method comprises that: a source eNB that has received an RRC reestablishment message determines, according to a PCI of a cell where an RLF occurs in the massage, all target eNBs to which RLF information needs to be sent, and sends the RLF information to each determined target eNB; after receiving the RLF information, the target eNB determines the cell where the RLF occurs under the target eNB according to the PCI of the cell where the RLF occurs, and determines in each determined cell whether a C-RNTI of the terminal in the cell where the RLF occurs belongs to C-RNTIs existing in the cell; if the C-RNTI belongs to the C-RNTIs existing in the cell, then the terminal is determined to be a terminal of the cell, otherwise the terminal is determined not to be a terminal of the cell. The disclosure enables the terminal to be identified accurately and uniquely.

11 Claims, 3 Drawing Sheets

(56) References Cited

U.S. PATENT DOCUMENTS

| | | | |
|---|---|---|---|
| 2007/0153751 A1* | 7/2007 | Svensson et al. | 370/338 |
| 2008/0242292 A1* | 10/2008 | Koskela et al. | 455/423 |
| 2009/0163211 A1* | 6/2009 | Kitazoe et al. | 455/436 |
| 2010/0165836 A1* | 7/2010 | Wahlqvist et al. | 370/225 |
| 2011/0039552 A1* | 2/2011 | Narasimha et al. | 455/425 |
| 2011/0269426 A1* | 11/2011 | Hultin et al. | 455/411 |
| 2012/0064886 A1* | 3/2012 | Kim et al. | 455/423 |
| 2013/0148490 A1* | 6/2013 | Yi et al. | 370/216 |
| 2013/0225157 A1* | 8/2013 | Sikri et al. | 455/423 |
| 2013/0237222 A1* | 9/2013 | Seki | 455/434 |
| 2013/0260766 A1* | 10/2013 | Lee et al. | 455/436 |
| 2014/0050102 A1* | 2/2014 | Lee et al. | 370/242 |
| 2014/0078885 A1* | 3/2014 | Koskinen et al. | 370/216 |

FOREIGN PATENT DOCUMENTS

| | | |
|---|---|---|
| WO | 2008151658 A1 | 12/2008 |
| WO | WO2008/151658 A1 * | 12/2008 |
| WO | 2009022796 A2 | 2/2009 |
| WO | 2009076208 A2 | 6/2009 |

OTHER PUBLICATIONS

English Translation of the Written Opinion of the International Search Authority in international application No. PCT/CN2010/070548, mailed on Jun. 24, 2010.
Technical Specification Group Radio Access Network Jun. 18, 2009. Correction for short MAC-I generation Feb. 3, 2009.
ZTE & Samsung, PCI confusion resolution in the RLF Event Report, 3GPP TSG Ran WG3 #65bis, R3-092304, Japan, Oct. 2009.
ZTE, Handover Cause Report for Mobility Robustness Optimization, 3GPP TSG RAN WG3 #65, R3-091662, China, Aug. 2009.
3GPP, Self-configuring and self-optimizing network use cases and solutions (Release 9), 3GPP TR 36.902 V1.2.0, France, May 2009.
3rd Generation Partnership Project; Technical Specification Group Radio Access Network; Evolved Universal Terrestrial Radio Access Network (E-UTRAN); Self configuring and self optimizing network use cases and solutions (Release 9); 3GPP TR 36.902 V1.2.0, May 2009. (43 pages).

* cited by examiner (Prior Art)

METHOD AND SYSTEM FOR IDENTIFYING A TERMINAL

TECHNICAL FIELD

The disclosure relates to a radio cellular communication system, particularly to a method and system for identifying a terminal in a handover optimization scenario in a Long Term Evolution (LTE) mobile communication system.

BACKGROUND

An LTE network consists of an Evolved Universal Terrestrial Radio Access Network (E-UTRAN) evolved NodeB (eNB) and an Evolved Packet Core (EPC), and the network is flattened; wherein the E-UTRAN comprises a set of eNBs connected with the EPC through an S1 interface and the eNBs connect with each other through an X2 interface. The S1 and X2 interfaces are logical interfaces. One EPC can manage one or more eNBs, one eNB can be controlled by multiple EPCs, and one eNB can manage one or more cells.

The Self-Organizing Network (SON) technology is a technology capable of automatically configuring and optimizing the network, which is characterized in self-configuration and self-optimization. The technology is applied in the LTE system to enable the LTE eNB to automatically configure a network parameter according to certain measurement and perform an automatic optimization according to the change of the network, thereby maintaining the optimal network performance and saving a great amount of manpower and material resources.

As for the self-optimization of the handover parameter of the LTE system, the parameter related to a cell re-selection and handover is required to be optimized according to a certain algorithm, operation condition of the network and handover-related measurement, so as to improve the network performance. Wherein the handover herein refers to handover within the LTE system or handover between the systems, wherein (1) a handover between the systems is a handover to the Universal Terrestrial Radio Access Network (UTRAN), Global System for Mobile Communication (GSM) or Code Division Multiple Access (CDMA) system;

(2) a handover process of a terminal in the network, i.e. a handover within the system, is that: the network side makes a handover decision on the basis of a certain handover algorithm according to the signal quality of the current cell and a neighboring cell reported by the terminal and then notifies the terminal to execute a specific handover flow according to the handover decision.

During the handover, inappropriate setting of the handover parameter will result in a ping-pong handover, handover failure and Radio Link Failure (RLF), which are undesired and bring negative effect to user experience and result in waste of the network resources. Therefore, for a self-optimization of the handover parameter, an adjustment of the handover parameter is based on accurately determining of the handover failure and undesired handover scenario.

RLF will occur to a User Equipment (UE) in the case of very poor radio link signal and the UE will perform reestablishment of Radio Resource Control (RRC). When the UE performs the RRC reestablishment, a target cell is obtained via a cell selection procedure. A source eNB or target eNB will keep the user information for reestablishing the RRC in the case of the handover failure during the handover process.

The UE will carry a UE-Identity which includes a Cell Radio Network Temporary Identifier (C-RNTI) of the UE, a short Medium Access Control Integrity protection (short-MAC-I) which is a short Medium Access Control Integrity check value and a Physical Cell Identity (PCI) in an RRC reestablishment request message, wherein the C-RNTI is allocated in the source cell (for the scenario of the handover failure), or allocated in a cell triggering the RRC reestablishment (for other scenarios);

the PCI is the physical identity of the source cell (for the scenario of the handover failure), or the physical identity of a cell triggering the RRC reestablishment (for other scenarios);

the shortMAC-I is calculated by using a KRRCint key of the source cell (for the scenario of the handover failure) or a cell triggering the RRC reestablishment and an integrity protection algorithm; the PCI, C-RNTI and Evolved Cell Global Identifier (ECGI) are input, wherein the PCI and C-RNTI are contained in the RRC reestablishment message and the ECGI is an ECGI of a target cell selected by the UE during the RRC reestablishment.

In an existing handover, three typical undesired handover scenarios are as follows:

first: a scenario of a too-late handover, as shown in FIG. 1, RLF occurs to a terminal (i.e. UE) in a cell b under an eNB B, then the UE attempts to perform an RRC reestablishment in a cell a under an eNB A, which indicates that the handover of the UE from the cell b to cell a is too late;

second: a scenario of a too-early handover, as shown in FIG. 2, soon after a handover of a UE from a cell a under an eNB A to a cell b under an eNB B is performed, an RLF occurs in the cell b and the UE subsequently selects the cell a under the eNB A to perform an RRC reestablishment, that is the UE returns to the cell a before the handover to perform the RRC reestablishment, which indicates that the previous handover of the UE from the cell a to cell b is too early;

third: a scenario of selecting a wrong cell during a handover, as shown in FIG. 3, wherein an RLF occurs soon after a handover of a UE from a cell c under an eNB C to a cell b under an eNB B is performed, and the UE subsequently performs an RRC reestablishment in a cell a under an eNB A, which indicates that the cell b under the eNB B which is selected before the handover is a wrong target cell and the correct target cell should be the cell a under the eNB A, that is, the UE should directly performs the handover from the cell c under the eNB C to the cell a under the eNB A.

For the aforementioned three typical undesired handover scenarios, how to determine the type of an undesired handover is a key problem, and an existing method for the determining comprises the following steps:

step 1: an eNB A notifies an eNB B of RLF information; wherein the RLF information comprises: a PCI of a cell where the RLF occurs, a PCI or an ECGI of a cell attempting an RRC reestablishment, and a C-RNTI of a UE in the cell where the RLF occurs, wherein the PCI of the cell where the RLF occurs and the C-RNTI information of the UE in the cell where the RLF occurs are from the RRC reestablishment message of the UE received by the eNB A;

step 2: the eNB B receives the RLF information and performs the determining according to UE context information contained in the RLF information, namely information of the PCI and C-RNTI:

if the UE is just handed over from a cell a under the eNB A, then the eNB B determines that the handover of the UE from the cell a to cell b is too early, as shown in FIG. 2 and notifies the eNB A of the result of the determining;

if the UE is just handed over from a cell c under an eNB C, then the eNB B determines that the target cell selected by the UE during the handover from the cell c to cell b is an error, as shown in FIG. 3, and the correct target cell is the cell a and the eNB B notifies the eNB C of the result of the determining;

otherwise, the eNB B then determines that the handover of the UE from the cell b to the cell a is too late, as shown in FIG. 1.

At present, one problem existing in the method for determining a handover scenario is that the eNB A determines a cell where the RLF occurs and the eNB to which the cell belongs according to the PCI information in the RRC reestablishment message from the UE. In the case of PCI confusion, that is, the PCIs of the two cells are identical, the eNB A may identify a wrong cell where the RLF occurs and select a wrong target eNB receiving the RLF information when sending the RLF information, that is, the cell b where the RLF occurs and eNB B cannot be uniquely identified only by the PCI information in the RRC reestablishment message, thereby certainly resulting in an inaccurate optimization of a handover parameter and reducing the self-optimization function of the handover parameter.

Therefore, in order to avoid the aforementioned problem that an error occurs during sending RLF, which is possibly caused by the PCI confusion, the terminal should be further identified. Since the terminal is unique, if the terminal can be identified uniquely, then the cell where the terminal is located, namely the unique cell where an RLF occurs, can be accurately determined, thereby increasing the accuracy of an optimization of the handover parameter and enhancing the self-optimization function. Thus, how to identify a terminal in a handover scenario has become a problem to be solved.

SUMMARY

In order to solve the existing technical problem, the disclosure provides a method and system for identifying a terminal, for accurately and uniquely identifying a terminal in a handover optimization scenario in an LTE mobile communication system.

In order to solve the aforementioned problem, the disclosure provides a method for identifying a terminal, comprising the following steps:

step 11: a source eNB that has received an RRC reestablishment message determines according to a PCI of a cell where an RLF occurs in the massage, all target eNBs to which RLF information needs to be sent, and sends the RLF information to each determined target eNB; wherein the RLF information comprises: the PCI of the cell where the RLF occurs, an ECGI of a cell attempting to perform RRC reestablishment, and a C-RNTI of a terminal in the cell where the RLF occurs;

step 12: after receiving the RLF information, the target eNB determines, according to the PCI of the cell where the RLF occurs, the cell where the RLF occurs under the target eNB, and determines in the each determined cell whether the received C-RNTI of the terminal in the cell where the RLF occurs belongs to C-RNTIs existing in the cell, if yes, then the terminal is determined to be a terminal of the cell where the RLF occurs under the target eNB, otherwise, the terminal is determined not to be a terminal of the cell;

wherein the source eNB is an eNB that has received the RRC reestablishment message and the target eNB is an eNB to which the cell where the RLF occurs belongs.

The method may further comprise: before the step 11, the terminal to which the RLF occurs sends the RRC reestablishment message to the source eNB selected via a cell selection procedure; wherein the RRC reestablishment message comprises: the C-RNTI of the terminal in the cell where the RLF occurs, a shortMAC-I and the PCI of the cell where the RLF occurs.

Further, the method may comprise:

step 13: after determining that the terminal belongs to the cell where the RLF occurs under the target eNB, the target eNB determines a type of a handover scenario among the cells corresponding to a last handover according to information of the last handover of the terminal and notifies an eNB corresponding to the last handover of a result of determining;

step 14: the eNB that has received the result of determining automatically performs an optimization of a handover parameter according to the determining of the handover scenario among cells corresponding to the last handover.

The disclosure further provides an eNB supporting terminal identification, the eNB is arranged to receive, as a source eNB, an RRC reestablishment message from a terminal, determine all target eNBs to which RLF information needs to be sent according to a PCI of a cell where an RLF occurs in the massage, and send the RLF information to each determined target eNB; wherein the RLF information comprises: the PCI of the cell where the RLF occurs, an ECGI of a cell attempting to perform RRC reestablishment, and a C-RNTI of the terminal in the cell where the RLF occurs;

the eNB is further arranged to receive the RLF information as a target eNB when an RLF occurs in a cell managed by the eNB, and determine the cell where the RLF occurs according to the PCI of the cell where the RLF occurs in the RLF information, and determine in each determined cell whether the received C-RNTI of the terminal in the cell where the RLF occurs belongs to C-RNTIs existing in the cell, if yes, then the terminal is determined to be a terminal of the cell, otherwise, the terminal is determined not to be a terminal of the cell.

The eNB of the disclosure may be further arranged to determine a type of a handover scenario among cells corresponding to a last handover according to information of the last handover of the terminal after determining, as a target eNB, the terminal to be a terminal of the cell where the RLF occurs under the target eNB, and notify a result of determining to an eNB corresponding to the last handover; the eNB that has received the result of determining automatically performs an optimization of a handover parameter according to determining of the handover scenario among cells corresponding to the last handover.

The disclosure further provides a system for identifying a terminal, the system comprises a source eNB and one or more target eNBs, wherein the source eNB is an eNB that has received an RRC reestablishment message and is arranged to receive the RRC reestablishment message from a terminal, determine all target eNBs to which RLF information needs to be sent according to a PCI of a cell where an RLF occurs in the RRC reestablishment message, and send the RLF information to each target eNB, wherein the RLF information comprises: the PCI of the cell where the RLF occurs, an ECGI of a cell attempting to perform RRC reestablishment, and a C-RNTI of the terminal in the cell where the RLF occurs;

the target eNB is an eNB to which the cell where the RLF occurs belongs and is arranged to receive the RLF information, determine the cell according to the PCI of the cell where the RLF occurs, and determine in each determined cell whether the received C-RNTI of the terminal in the cell where the RLF occurs belongs to C-RNTIs existing in the cell; if yes, then the terminal is determined to be a terminal of the cell where the RLF occurs under the target eNB, otherwise, the terminal is determined not to be a terminal of the cell.

The system for identifying a terminal of the disclosure may further comprise a terminal, wherein the terminal may be arranged to send, after the RLF occurs, the RRC reestablishment message to the source eNB selected via a cell selection procedure; wherein the RRC reestablishment message comprises: the C-RNTI of the terminal in the cell where the RLF occurs, a shortMAC-I and the PCI of the cell where the RLF occurs.

The target eNB may be further arranged to determine a type of a handover scenario among cells corresponding to a last handover according to information of the last handover of the terminal after determining the terminal to be a terminal of the cell where the RLF occurs under the target eNB, and notify an eNB corresponding to the last handover of a result of determining; the eNB that has received the result of determining automatically performs an optimization of a handover parameters according to determining of the handover scenario among cells corresponding to the last handover.

The disclosure further provides another method for identifying a terminal, comprising the following steps:

step 21: a source eNB that has received an RRC reestablishment message determines, according to a PCI of a cell where an RLF occurs in the RRC reestablishment message, all target eNBs to which RLF information needs to be sent, and sends the RLF information to each target eNB; wherein the RLF information comprises: the PCI of the cell where the RLF occurs, an ECGI of a cell attempting to perform RRC reestablishment, a C-RNTI of the terminal in the cell where the RLF occurs, and a shortMAC-I;

step 22: after receiving the RLF information, the target eNB determines the cell according to the PCI of the cell where the RLF occurs, obtains in each determined cell a calculated value of a shortMAC-I by performing calculation according to the PCI of the cell where the RLF occurs, the ECGI of the cell attempting to perform RRC reestablishment and the C-RNTI of the terminal in the cell where the RLF occurs; if the calculated value is the same as the received shortMAC-I, the terminal is determined to be a terminal of the cell where the RLF occurs under the target eNB, otherwise, the terminal is determined not to be a terminal of the cell;

wherein the source eNB is an eNB that has received the RRC reestablishment message and the target eNB is an eNB to which the cell where the RLF occurs belongs.

The method of the disclosure may further comprise: before the step of obtaining the calculated value of the shortMAC-I by calculation, determine in each determined cell whether the received C-RNTI of the terminal in the cell where the RLF occurs belongs to C-RNTIs existing in the cell; if yes, then the step of obtaining the calculated value of the shortMAC-I via calculation is performed, otherwise, the terminal is determined not to be a terminal of the cell.

The method of the disclosure may further comprise: before step 21, the terminal to which the RLF occurs sends the RRC reestablishment message to the source eNB selected via a cell selection procedure; wherein the RRC reestablishment message comprises: the C-RNTI of the terminal in the cell where the RLF occurs, a shortMAC-I and the PCI of the cell where the RLF occurs.

The method may further comprise:

step 23: after determining that the terminal belongs to the cell where the RLF occurs under the target eNB, the target eNB determines a type of a handover scenario among cells corresponding to a last handover according to information of the last handover of the terminal and notifies an eNB corresponding to the last handover of a result of determining;

step 24: the eNB that has received the result of determining automatically performs an optimization of a handover parameter according to the determining of the handover scenario among cells corresponding to the last handover.

In step 22, the target eNB may determine a key and an integrity protection algorithm according to the C-RNTI in the cell, input the PCI of the cell where the RLF occurs, the ECGI of the cell attempting to perform RRC reestablishment and the C-RNTI of the terminal in the cell where the RLF occurs in the RLF information, and perform calculation to obtain the calculated value of the shortMAC-I.

The disclosure further provides an eNB supporting terminal identification, wherein the eNB is arranged to receive an RRC reestablishment message as a source eNB, determine all target eNBs to which RLF information needs to be sent according to a PCI of a cell where an RLF occurs in the RRC reestablishment message, and send the RLF information to each determined target eNB; wherein the RLF information comprises: the PCI of the cell where the RLF occurs, an ECGI of a cell attempting to perform RRC reestablishment, a C-RNTI of a terminal in the cell where the RLF occurs and a shortMAC-I;

the eNB is further arranged to receive RLF information as a target eNB when an RLF occurs in a cell managed by the eNB, determine the cell where the RLF occurs under the eNB according to the PCI of the cell where the RLF occurs, and obtain in each determined cell a calculated value of the shortMAC-I by performing calculation according to the PCI of the cell where the RLF occurs, an ECGI of a cell attempting to perform RRC reestablishment and a C-RNTI of the terminal in the cell where the RLF occurs; if the calculated value is the same as the received shortMAC-I, the terminal is determined to be a terminal of the cell, otherwise, the terminal is determined not to be a terminal of the cell.

The eNB of the disclosure may be further arranged to determine , as a target eNB, in each determined cell whether the received C-RNTI of the terminal in the cell where the RLF occurs belongs to C-RNTIs existing in the cell, if yes, then the calculated value of the shortMAC-I is obtained by calculation, otherwise, the terminal is determined not to be a terminal of the cell.

The eNB of the disclosure may be further arranged to determine a type of a handover scenario among cells corresponding to a last handover according to information of the last handover of the terminal after determining, as a target eNB, the terminal to be a terminal of the cell where the RLF occurs under the target eNB, and notify a result of determining to an eNB corresponding to the last handover; the eNB that has received the result of determining automatically performs an optimization of a handover parameter according to the determining of the handover scenario among the cells corresponding to the last handover.

The disclosure further provides another system for identifying a terminal, wherein the system comprises a source eNB and one or more target eNBs, wherein the source eNB is an eNB that has received an RRC reestablishment message, and is arranged to receive the RRC reestablishment message from a terminal, determine all target eNBs to which RLF information needs to be sent according to a PCI of a cell where an RLF occurs in the RRC reestablishment message, and send the RLF information to each target eNB; wherein the RLF information comprises: the PCI of the cell where the RLF occurs, an ECGI of a cell attempting to perform RRC reestablishment, a C-RNTI of the terminal in the cell where the RLF occurs, and a shortMAC-I;

the target eNB is an eNB to which the cell where the RLF occurs belongs, and is arranged to receive the RLF information, determine the cell according to the PCI of the cell where the RLF occurs, and obtain in each determined cell a calculated value of the shortMAC-I by performing calculation according to the PCI of the cell where the RLF occurs, the ECGI of the cell attempting to perform RRC reestablishment and the C-RNTI of the terminal in the cell where the RLF occurs; if the calculated value is the same as the received shortMAC-I, the terminal is determined to be a terminal of the cell where the RLF occurs under the target eNB, otherwise, the terminal is determined not to be a terminal of the cell.

The system for identifying a terminal may further comprise a terminal, the terminal is arranged to send, after the RLF occurs, the RRC reestablishment message to the source eNB selected via a cell selection procedure; wherein the RRC reestablishment message comprises: the C-RNTI of the terminal in the cell where the RLF occurs, the shortMAC-I and the PCI of the cell where the RLF occurs.

The target eNB may be further arranged to determine in each determined cell whether the received C-RNTI of the terminal in the cell where the RLF occurs belongs to C-RNTIs existing in the cell, if yes, the calculated value of the short-MAC-I is obtained via calculation, otherwise the terminal is determined not to be a terminal of the cell.

The target eNB may be further arranged to determine a type of a handover scenario among cells corresponding to a last handover according to information of the last handover of the terminal after determining the terminal to be a terminal of the cell where the RLF occurs under the target eNB, and notify an eNB corresponding to the last handover of a result of determining; the eNB that has received the result of determining automatically performs an optimization of a handover parameter according to the determining of the handover scenario among the cells corresponding to the last handover.

In the method and system for identifying a terminal of the disclosure, after an RLF occurs to the terminal, an RRC reestablishment message sent to a source eNB further contains a C-RNTI of the terminal in a cell where the RLF occurs, and a shortMAC-I The source eNB sends RLF information containing the C-RNTI, shortMAC-I and PCI to a target eNB. The target eNB is arranged to identify the terminal according to the C-RNTI and PCI, or according to the C-RNTI, short-MAC-I and PCI. Since the disclosure can accurately and uniquely identify the terminal, to further accurately and uniquely identify the cell where the RLF occurs, thereby solving the problem that the eNB A identifies a wrong cell where the RLF occurs and a wrong target eNB receiving the RLF information is selected when sending the RLF information. Further, after the terminal is identified, the handover scenario is determined according to the method for determining the handover scenario, then the corresponding eNB is notified to perform a network self-optimization.

BRIEF DESCRIPTION OF THE DRAWING

FIG. 1 shows a schematic diagram of an undesired too-late handover of a UE from a cell b to cell a;

DETAILED DESCRIPTION

Figure 1:
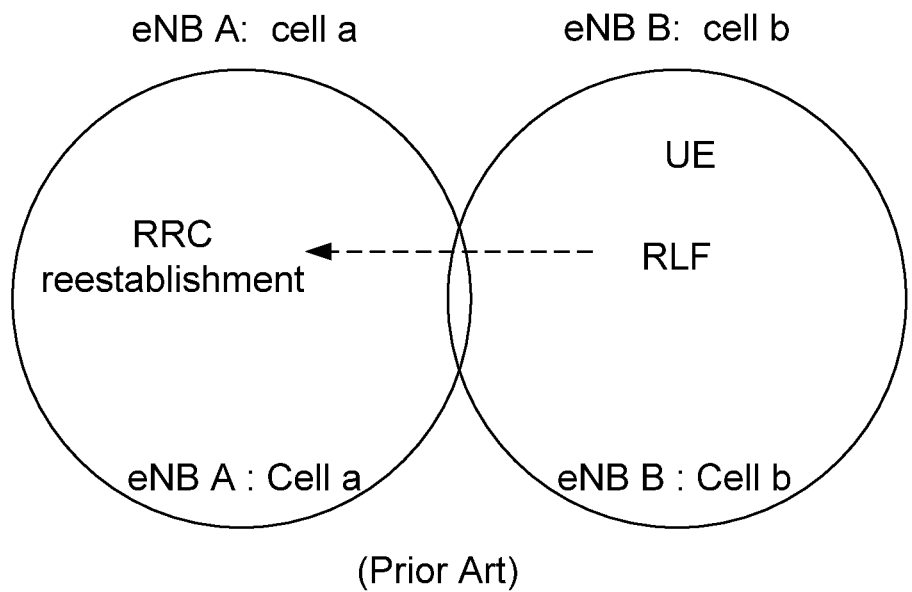

In order to make the object, technical solution and advantages of the disclosure more clear, the disclosure is further described in details with reference to the drawings.

The disclosure provides a method and system for identifying a terminal in a handover optimization scenario. After an RLF occurs to a terminal, an RRC reestablishment message sent to a source eNB further contains a C-RNTI of the UE in a cell where the RLF occurs, and further contains a short-MAC-I; the source eNB sends RLF information containing the C-RNTI, shortMAC-I and PCI to the target eNB; the target eNB is used for identifying the terminal according to the C-RNTI and PCI, or according to the C-RNTI, short-MAC-I and PCI. Since the disclosure can uniquely identify the terminal, and further uniquely determine the cell where the RLF occurs, thereby solving the problem that the eNB A identifies a wrong cell where the RLF occurs and select a wrong target eNB receiving the RLF information when sending the RLF information. Further, after the terminal is identified, the handover scenario is determined according to the method for determining the handover scenario and then a corresponding eNB is notified to perform a network self-optimization.

In order to achieve the object above, the disclosure provides a method for identifying a terminal, comprising the following steps:

step 11: a source eNB that has received an RRC reestablishment message determines, according to a PCI of a cell where an RLF occurs in the message, all target eNBs to which RLF information needs to be sent, and sends the RLF information to each target eNB; the RLF information comprises: the PCI of the cell where the RLF occurs, a PCI or an ECGI of a cell attempting to perform the RRC reestablishment, and a C-RNTI of a terminal in the cell where the RLF occurs;

step 12: after receiving the RLF information, the target eNB determines the cell according to the PCI of the cell where the RLF occurs, and determines in each determined cell whether the received C-RNTI of the terminal in the cell where the RLF occurs belongs to C-RNTIs existing in the cell; if the C-RNTI belongs to the C-RNTIs existing in the cell, then the terminal is determined to be a terminal of the cell where the RLF occurs under the target eNB, otherwise the terminal is determined not to be a terminal of the cell.

Before step 11, after the RLF occurs to the terminal, the RRC reestablishment message is sent from the terminal to the source eNB selected via a cell selection procedure; wherein, the RRC reestablishment message comprises: the C-RNTI of the terminal in the cell where the RLF occurs, a shortMAC-I and the PCI of the cell where the RLF occurs.

The first method is used for identifying a terminal only through the PCI and C-RNTI. In the LTE system, when transmitting the RLF information, the source eNB that has received the RRC reestablishment message determines the target eNB to send the RLF information through the PCI of the cell where the RLF occurs. If multiple target eNBs are matched through the PCI information, the RLF information is then sent to all the matched target eNBs. The RLF information transmitted to the target eNB comprises the PCI of the cell where the RLF occurs, the PCI or ECGI of the cell attempting to perform the RRC reestablishment and the C-RNTI of the UE in the cell where the RLF occurs.

The target eNB identifies the terminal according to the PCI of the cell where the RLF occurs and the C-RNTI of the UE in the cell where the RLF occurs in the RLF information. if the C-RNTI value is an allocated C-RNTI value existing in the cell b, then it is indicated that the terminal is a terminal of the cell b managed by this eNB; otherwise, the terminal does not belong to the cell. If multiple cells are matched by the target eNB according to the PCI, terminal identification is performed according to the C-RNTI in each cell. The first identification method can identify a terminal while reducing the calculation complexity of the eNB and the terminal is roughly identified in a relatively simple way.

In order to more accurately identify a terminal, the disclosure further provides another method for identifying a terminal, comprising the following steps:

step 21: a source eNB that has received an RRC reestablishment message determines, according to a PCI of a cell where an RLF occurs in the message, all target eNBs to which RLF information needs to be sent, and sends the RLF information to each target eNB; the RLF information comprises: the PCI of the cell where the RLF occurs, an ECGI of a cell attempting to perform the RRC reestablishment, a C-RNTI of a terminal in the cell where the RLF occurs and a shortMAC-I;

step 22: after receiving the RLF information, the target eNB determines the cell according to the PCI of the cell where the RLF occurs, obtains a calculated value of a shortMAC-I in each determined cell by performing calculation according to the PCI of the cell where the RLF occurs, the ECGI of the cell attempting to perform the RRC reestablishment and the C-RNTI of the terminal in the cell where the RLF occurs; if the calculated value is the same as the received shortMAC-I, the terminal is determined to be a terminal of the cell where the RLF occurs under the target eNB, otherwise the terminal is determined not to be a terminal of the cell.

Before step 21, after the RLF occurs to the terminal, the RRC reestablishment message is sent from the terminal to the source eNB selected via a cell selection procedure; wherein the RRC reestablishment message comprises: the C-RNTI of the terminal in the cell where the RLF occurs, a shortMAC-I and the PCI of the cell where the RLF occurs.

In the LTE system, the source eNB that has received the RRC reestablishment message determines, when transmitting the RLF information, the target eNB to send the RLF information according to the PCI of the cell where the RLF occurs. Except the PCI of the cell where the RLF occurs, the ECGI of the cell attempting to perform the RRC reestablishment, and the C-RNTI of the UE in the cell where the RLF occurs, the RLF information transmitted to the target eNB further includes a shortMAC-I.

The target eNB determines the terminal uniquely according to the PCI, C-RNTI and shortMAC-I, wherein if multiple target eNBs are matched by the source eNB through the PCI information, the RLF information is then sent to all the matched target eNBs. After receiving the RLF information, the target eNB determines a key and an integrity protection algorithm according to the C-RNTI in the RLF information, inputs the PCI, ECGI and C-RNTI in the RLF information and performs calculation to obtain a calculated value of a shortMAC-I. If the calculated value of a shortMAC-I is the same as the shortMAC-I in the RLF information, the terminal is determined to be a terminal of the target cell under the target eNB, thereby accurately determining the cell where the RLF occurs to the terminal. If multiple cells are matched by the same target eNB through the PCI, shortMAC-I verification is performed in the multiple cells, thereby determining the cell where the RLF occurs to the terminal.

Through the second method, after receiving the RRC reestablishment message from the UE, the eNB identifies the terminal according to the shortMAC-I in the RRC reestablishment message, thereby avoiding confusion of the cell where the RLF occurs. On this basis, a specific handover parameter can be optimized to reduce waste of network resources and improve the network performance, thereby realizing the self-optimization function of the network.

After a terminal is determined by the first and second methods, the type of the handover scenario is further determined according to the last handover information of the UE, wherein the types of the handover scenario comprise: a too-late handover of the UE, or a too-early handover of the UE, or a wrong cell is selected during a handover of the UE. The result of determining is notified to a corresponding eNB. The corresponding eNB automatically performs an optimization of a handover parameter according to the determining of the handover scenario among the corresponding cells, thereby improving the handover performance.

Base on the aforementioned method for identifying a terminal, the disclosure further provides a system for identifying a terminal. The system comprises a terminal, a source eNB, and one or more target eNBs, wherein the terminal is arranged to send, after an RLF occurs, an RRC reestablishment message to the source eNB selected via a cell selection procedure, wherein the RRC reestablishment message comprises: a C-RNTI of the terminal in a cell where the RLF occurs, a shortMAC-I and a PCI of the cell where the RLF occurs;

the source eNB is an eNB that has received the RRC reestablishment message and arranged to determine, after receiving the RRC reestablishment message, all target eNBs to which RLF information needs to be sent according to the PCI of the cell where the RLF occurs in the RRC reestablishment message, and send the RLF information to each target eNB, wherein the RLF information comprises: the PCI of the cell where the RLF occurs, a PCI or an ECGI of a cell attempting to perform the RRC reestablishment, and the C-RNTI of the terminal in the cell where the RLF occurs;

the target eNB is an eNB managing a cell where the RLF occurs and is arranged to determine, after receiving the RLF information, the cell according to the PCI of the cell where the RLF occurs, and determine in each determined cell whether the received C-RNTI of the terminal in the cell where the RLF occurs belongs to C-RNTIs existing in the cell; if the received C-RNTI belongs to the C-RNTIs existing in the cell, then the terminal is determined to be a terminal of the cell where the RLF occurs under the target eNB, otherwise the terminal is determined not to be a terminal of the cell.

In order to more accurately identify a terminal, the disclosure further provides another system for identifying a terminal. The system comprises a terminal, a source eNB and one or more target eNBs, wherein the terminal is arranged to send, after an RLF occurs, an RRC reestablishment message to the source eNB selected via a cell selection procedure, wherein the RRC reestablishment message comprises: a C-RNTI of the terminal in a cell where the RLF occurs, a shortMAC-I and a PCI of the cell where the RLF occurs;

the source eNB is an eNB that has received the RRC reestablishment message, and arranged to determine, after receiving the RRC reestablishment message, all target eNBs to which RLF information needs to be sent according to the PCI of the cell where the RLF occurs in the RRC reestablishment message, and send the RLF information to each target eNB, wherein the RLF information comprises: the PCI of the cell where the RLF occurs, an ECGI of a cell attempting to perform the RRC reestablishment, the C-RNTI of the terminal in the cell where the RLF occurs and the shortMAC-I;

the target eNB is an eNB managing a cell where the RLF occurs and is arranged to obtain, after receiving the RLF information, in the cell determined according to the PCI of the cell where the RLF occurs, a calculated value of a short- MAC-I by performing calculation according to the PCI of the cell where the RLF occurs, the ECGI of the cell attempting to perform the RRC reestablishment and the C-RNTI of the terminal in the cell where the RLF occurs; if the calculated value is the same as the received shortMAC-I, the terminal is determined to be a terminal of the cell where the RLF occurs under the target eNB, otherwise the terminal is determined not to be a terminal of the cell.

Through the aforementioned methods and systems for identifying a terminal, an eNB can identify a terminal to which RLF occurs and further uniquely determine a cell where the RLF occurs. According to the RLF-related information, the target eNB can determine the type of the handover scenario. On this basis, an optimization of a specific handover parameter can be realized in the network, thereby realizing the self-optimization function of the network and improving the network performance. The terminal identification process of the disclosure is described in details hereinafter with four embodiments.

Embodiment 1: Identification of a Terminal in the Case of a Too-Late Handover

Figure 4:
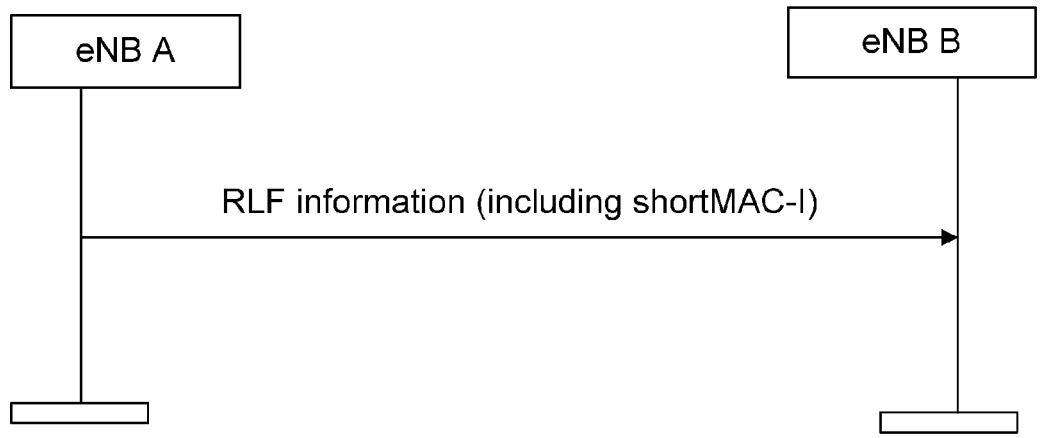
FIG. 4 shows a schematic diagram of sending an RLF information notification in the disclosure.

With reference to FIG. 1 and FIG. 4, embodiment 1 is described in details as follows.

101: a UE is in a connection state in a cell b managed by an eNB B, an RLF occurs to the UE in the cell b due to RRC reconfiguration failure, handover failure or other reasons.

102: after the RLF occurs to the UE in the cell b, a cell a managed by an eNB A is selected via a cell selection procedure to perform an RRC reestablishment; the UE sends an RRC reestablishment request message to the eNB A, as shown in FIG. 1.

103: the eNB A receives the RRC reestablishment request message from the UE, indexes, according to PCI information of the cell b where the RLF occurs, to a target eNB B to which RLF information needs to be sent, and sends the RLF information to the target eNB B; as shown in FIG. 4, besides the existing PCI information of the cell b where the RLF occurs, ECGI information of the cell attempting to perform the RRC reestablishment, and C-RNTI information of the UE in the cell b where the RLF occurs, the RLF information sent from the eNB A to the target eNB B further comprises shortMAC-I information of the RRC reestablishment request message from the UE; if the eNB A indexes to multiple target eNBs according to the PCI information of the cell b where the RLF occurs, the eNB A sends the RLF information to all the target eNBs; for example, an eNB H is a target eNB too.

104: the eNB B receives the RLF information from the eNB A and performs terminal identification to determine whether the UE to which the RLF occurs is a UE of the cell b managed by the eNB B; during the identification, the eNB B determines the cell b according to the PCI information in the received RLF information and further identifies the terminal according to the C-RNTI and shortMAC-I;

if the cell b has an allocated C-RNTI value, shortMAC-I verification is then performed; otherwise, that is, there is no corresponding allocated C-RNTI value in the cell, then it is indicated that the terminal is not a terminal of the cell b managed by the eNB B; there are a certain number of C-RNTIs in each cell and each UE in a connection state is distributed with one C-RNTI; after the RRC of the UE is released, the C-RNTI thereof is withdrawn; the eNB B determines a key and an integrity protection algorithm according to the C-RNTI, inputs the PCI, ECGI and C-RNTI in the RLF information and performs calculation to obtain a shortMAC-I; if the calculated shortMAC-I is the same as the shortMAC-I in the RLF information, the terminal is determined to be a terminal of the cell b managed by the eNB B; if the eNB B determines multiple cells according to the PCI information in the received RLF information, the terminal identification is performed in each cell;

provided that another eNB H also receives the RLF information from the eNB A, the eNB H performs the terminal identification according to the C-RNTI and shortMAC-I, and the identification method of the eNB H is the same as that of the eNB B.

105: the eNB B determines that the terminal is a terminal of the cell b managed by the eNB B according to the C-RNTI and shortMAC-I, which indicates that the RLF occurs to the terminal in the cell b of this eNB B and the cell a managed by the eNB A is selected to perform the RRC reestablishment; if the terminal is not just handed over to the cell b from another cell, it is indicated that the handover of the UE from the cell b to cell a is too late.

106: the eNB B can optimize a corresponding handover parameter according to the scenario of a too-late handover from the cell b to cell a, thereby improving the network performance.

Embodiment 2: Identification of a Terminal in the Case of a Too-Early Handover

Figure 2:
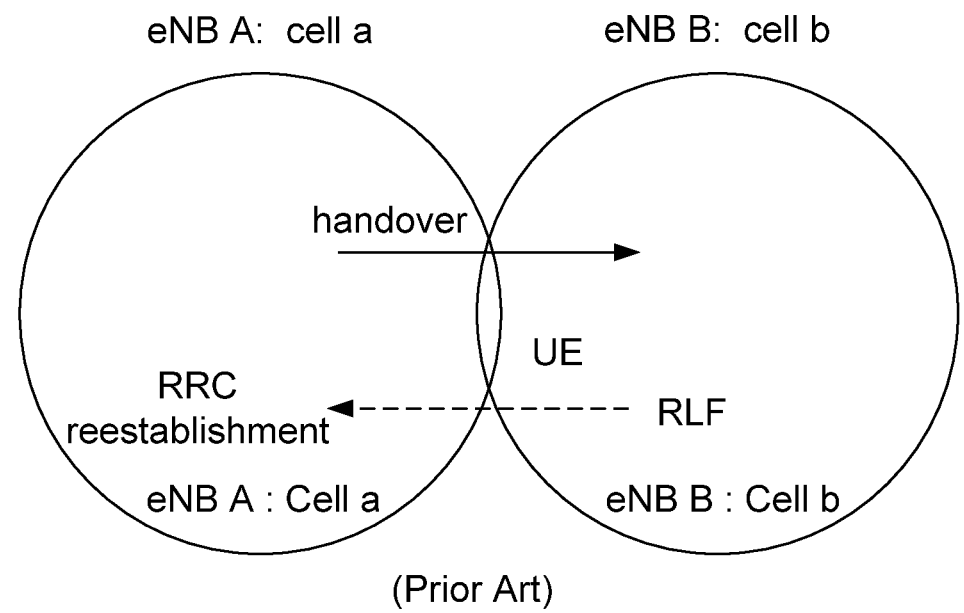
FIG. 2 shows a schematic diagram of an undesired too-early handover of a UE from a cell a to cell b.
Figure 5:
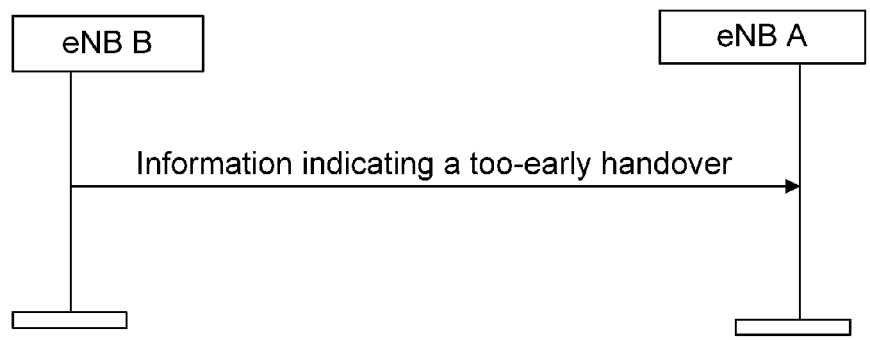
FIG. 5 shows a schematic diagram of sending information indicating a too-early handover in the disclosure.

With reference to FIG. 2, FIG. 4 and FIG. 5, embodiment 2 is described in details as follows.

201: soon after a UE is handed over from a cell a managed by an eNB A to a cell b managed by an eNB B, an RLF occurs to the UE in the cell b due to RRC reconfiguration failure, handover failure or other reasons;

wherein after the UE is handed over to the cell b successfully, the eNB B sets a timer for context of the UE to perform determining of a too-early handover and wrong cell and retains the context of the UE within the time of the timer; in the following steps 205 and 305, after matching of the terminal, when the timer corresponding to the context does not time out, it is indicated that it is not a long time after the UE is handed over to the cell b.

202: after the RLF occurs to the UE in the cell b, the cell a managed by the eNB A is selected via a cell selection procedure to perform an RRC reestablishment, and the UE sends an RRC reestablishment request message to the eNB A, as shown in FIG. 2.

203: the eNB A receives the RRC reestablishment request message from the UE, indexes, according to the PCI information of the cell b where the RLF occurs, to the target eNB B to which the RLF information needs to be sent, and sends the RLF information to the target eNB B; as shown in FIG. 4, besides the existing PCI information of the cell b where the RLF occurs, ECGI information of the cell attempting to perform the RRC reestablishment, and C-RNTI information of the UE in the cell b where the RLF occurs, the RLF information sent from the eNB A to the target eNB B further comprises shortMAC-I information of the RRC reestablishment request message from the UE; if the eNB A indexes to multiple target eNBs according to the PCI information of the cell b where the RLF occurs, the eNB A sends the RLF information to all the target eNBs; for example, an eNB H is also a target eNB.

204: the eNB B receives the RLF information from the eNB A and performs terminal identification to determine whether the UE to which the RLF occurs is a UE in the cell b managed by the eNB B; the eNB B determines the cell b according to the PCI information in the received RLF information and then identifies the terminal according to the C-RNTI and shortMAC-I; if the cell b has an allocated C-RNTI value, shortMAC-I verification is then performed; if the verification is passed, then it is indicated that the UE is a terminal of the cell b managed by the eNB B, otherwise, it is indicated that the terminal is not a terminal of the cell b managed by the eNB B; the eNB B determines a key and an integrity protection algorithm according to the C-RNTI, inputs the PCI, ECGI and C-RNTI in the RLF information and performs calculation to obtain a shortMAC-I; if the calculated shortMAC-I is the same as the shortMAC-I in the RLF information, the terminal is determined to be a terminal of the cell b managed by the eNB B; if the eNB B determines multiple cells according to the PCI information in the received RLF information, the terminal identification is performed in each cell;

if another eNB H also receives the RLF information from the eNB A, the terminal identification is performed according to the C-RNTI and shortMAC-I, and the identification method of the eNB H is the same as that of the eNB B.

205: the eNB B determines that the terminal is a terminal of the cell b managed by the eNB B according to the C-RNTI and shortMAC-I, which indicates that the RLF occurs to the terminal in the cell b of the eNB B and the cell a managed by the eNB A is selected to perform the RRC reestablishment; if the context timer of the terminal does not time out, it is indicated that the handover of the UE from the cell a to cell b is too early.

206: the eNB B sends information indicating a too-early handover to the eNB A to indicate that a too-early handover from the cell a to cell b occurs, as shown in FIG. 5.

207: the eNB A optimizes a corresponding handover parameter according to the scenario of a too-early handover from the cell a to cell b, thereby improving the network performance.

Embodiment 3: Identification of a Terminal in the Case of Selecting a Wrong Cell During a Handover With reference to FIG. 3, FIG. 4 and FIG. 6, embodiment 3 is described in details as follows.

301: soon after a UE is handed over from a cell c managed by an eNB C to a cell b managed by an eNB B, an RLF occurs to the UE in the cell b due to RRC reconfiguration failure, handover failure or other reasons;

wherein after the UE is handed over to the cell b successfully, the eNB B sets a timer for context of the UE.

Figure 3:
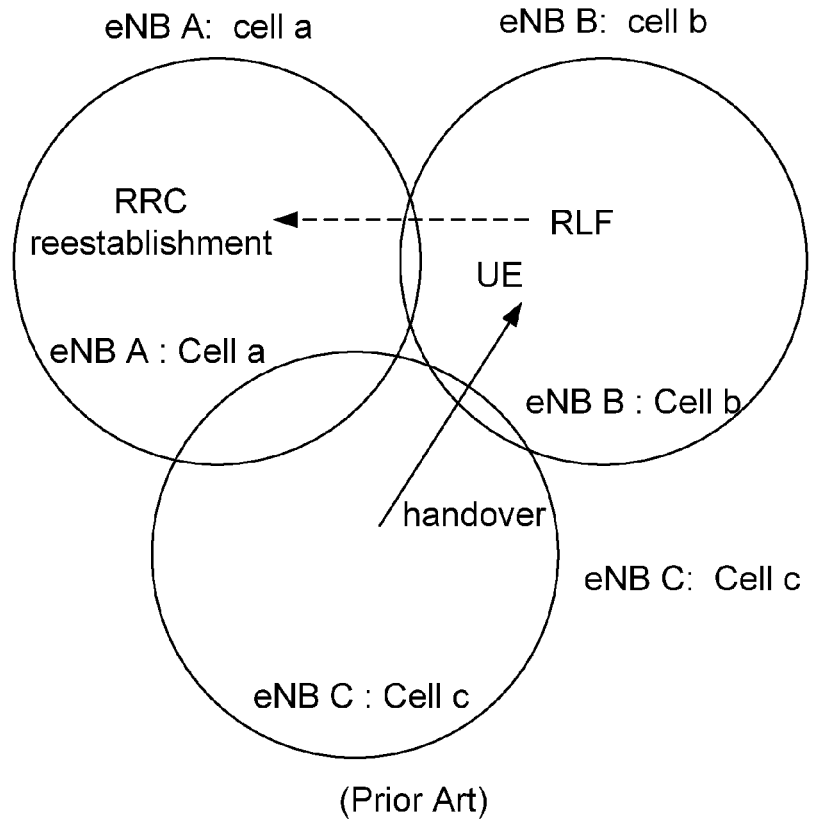
FIG. 3 shows a schematic diagram of an undesired handover in which a wrong cell is selected in a handover of a UE from a cell c to cell b.

302: after the RLF occurs to the UE in the cell b, a cell a managed by an eNB A is selected via a cell selection procedure to perform an RRC reestablishment, and the UE sends an RRC reestablishment request message to the eNB A, as shown in FIG. 3.

303: the eNB A receives the RRC reestablishment request message from the UE, indexes to the target eNB B to which the RLF information needs to be sent according to the PCI information of the cell b where the RLF occurs and sends the RLF information to the target eNB B; as shown in FIG. 4, besides the existing PCI information of the cell b where the RLF occurs, ECGI information of the cell attempting to perform the RRC reestablishment, and C-RNTI information of the UE in the cell b where the RLF occurs, the RLF information sent from the eNB A to the target eNB B further comprises shortMAC-I information of the RRC reestablishment request message from the UE; if the eNB A indexes to multiple target eNBs according to the PCI information of the cell b where the RLF occurs, the eNB A sends the RLF information to all the target eNBs; for example, an eNB H is also a target eNB.

304: the eNB B receives the RLF information from the eNB A and performs terminal identification to determine whether the UE to which the RLF occurs is a UE in the cell b managed by the eNB B; the eNB B determines the cell b according to the PCI information in the received RLF information, and then identifies the terminal according to the C-RNTI and shortMAC-I; if the cell b has an allocated C-RNTI value, shortMAC-I verification is then performed, otherwise, it is indicated that the terminal is not a terminal of the cell b managed by the eNB B; the eNB B determines a key and an integrity protection algorithm according to the C-RNTI, inputs the PCI, ECGI and C-RNTI in the RLF information and performs calculation to obtain a shortMAC-I; when the calculated shortMAC-I is the same as the shortMAC-I in the RLF information, the terminal is determined to be a terminal of the cell b managed by the eNB B; if the eNB B determines multiple cells according to the PCI information in the received RLF information, the terminal identification is performed in each cell;

if another eNB H also receives the RLF information from the eNB A, the terminal identification is performed according to the C-RNTI and shortMAC-I, and the identification method of the eNB H is the same as that of the eNB B.

305: the eNB B determines that the terminal is a terminal of the cell b managed by the eNB B according to the C-RNTI and shortMAC-I, which indicates that the RLF occurs to the terminal in the cell b of the eNB B and the cell a managed by the eNB A is selected to perform the RRC reestablishment; if the context timer of the terminal does not time out, it is indicated that a wrong cell is selected during the handover of the UE from the cell c to cell b, and the correct target cell is the cell a of the eNB A.

Figure 6:
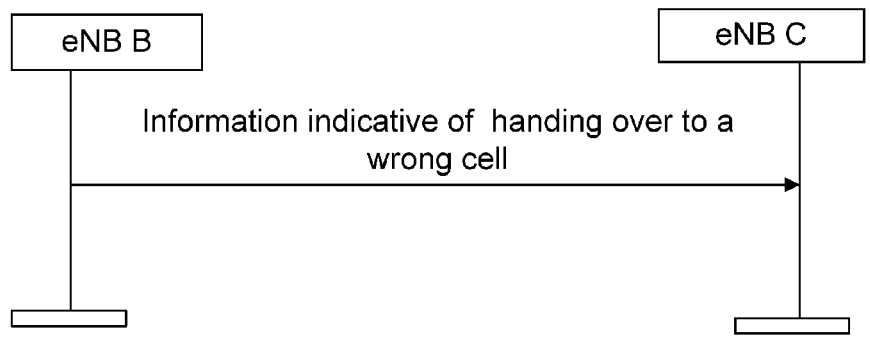
FIG. 6 shows a schematic diagram of sending information indicative of handing over to a wrong cell in the disclosure.

306: the eNB B sends to the eNB C information indicative of handing over to a wrong cell, which indicates that a wrong cell is selected during the handover from the cell c to cell b, as shown in FIG. 6.

307: the eNB C optimizes a corresponding handover parameter according to the scenario of selecting a wrong cell during the handover from the cell c to cell b, thereby improving the network performance.

Embodiment 4: Identifying a Terminal by Using a PCI and C-RNTI

401: a UE is in a connection state in a cell b managed by an eNB B, an RLF occurs to the UE in the cell b due to RRC reconfiguration failure, handover failure or other reasons.

402: after the RLF occurs to the UE in the cell b, a cell a managed by an eNB A is selected via a cell selection procedure to perform an RRC reestablishment, and the UE sends an RRC reestablishment request message to the eNB A.

403: the eNB A receives the RRC reestablishment request message from the UE, indexes to the target eNB B to which RLF information needs to be sent according to the PCI information of the cell b where the RLF occurs and sends the RLF information to the target eNB B; as shown in FIG. 4, if the eNB A indexes to multiple target eNBs according to the PCI information of the cell b where the RLF occurs, the RLF information is sent by the eNB A to all the target eNBs; for example, an eNB H is also a target eNB and the eNB A also sends the RLF information to the eNB H; the RLF information comprises: a PCI of the cell where the RLF occurs, a PCI or an ECGI of the cell attempting to perform the RRC reestablishment, and a C-RNTI of the UE in the cell where the RLF occurs.

404: the eNB B receives the RLF information from the eNB A and performs terminal identification to determine whether the UE to which the RLF occurs is a UE in the cell b managed by the eNB B; the eNB B determines the cell b according to the PCI information in the received RLF information and then identifies the terminal according to the C-RNTI; if the C-RNTI value is an existing allocated C-RNTI value in the cell b, it is indicated that the terminal is a terminal of the cell b managed by the eNB B, otherwise, the terminal is determined not to belong to this cell; the eNB H also performs the same terminal identification.

405: the eNB B receives the RLF information from the eNB A; if the terminal is determined to be a terminal of the cell b managed by the eNB B during the terminal identification, it can be acquired that the RLF occurs to the UE in the cell b of the eNB B, then it is attempted to perform an RRC reestablishment in the cell a of the eNB A; the type of the handover scenario is then determined according to the information of the last handover of the UE, wherein the types of the handover scenarios comprise: a too-late handover of the UE from the cell b to cell a, or a too-early handover of the UE from the cell a to cell b, or selecting a wrong cell during the handover of the UE from another cell to the cell b, for example a wrong cell is selected during the handover from the cell c of the eNB C to the cell b; the result of determining is notified to the corresponding eNB: the too-late handover is notified to the eNB B, the too-early handover is notified to the eNB A and a wrong selection during the handover is notified to the eNB c, as shown in FIG. 5 and FIG. 6.

406: the eNB A, eNB B and/or eNB C receiving the notification automatically optimizes a handover parameter according to the determining of the handover scenario among the corresponding cells, thereby improving the handover performance.

What are described above are only the preferred embodiments of the disclosure and not intended to limit the disclosure, and for those skilled in the prior art, there may be various modifications and changes to the disclosure. Any modifications, equivalent replacements and improvements etc. made within the spirit and principle of the disclosure should be included in the protection scope of the claims of the disclosure.

INDUSTRIAL APPLICABILITY

Compared with the existing technology, the disclosure can accurately and uniquely identify a terminal, thereby uniquely determining a cell where RLF occurs, thus solving the problem that an eNB A identifies a wrong cell where the RLF occurs when sending RLF information and selects a wrong target eNB to which the RLF information needs to be sent. Further, after the terminal is identified, the handover scenario is determined according to the method for determining the handover scenario and then the corresponding eNB is notified to perform the network self-optimization.

What is claimed is:

1. A method for identifying a terminal, comprising:
   receiving, by a source eNB, an RRC reestablishment message from a terminal to which an RLF occurs, wherein the RRC reestablishment message comprises: a C-RNTI allocated for the terminal in a cell where the RLF occurs, a PCI of the cell where the RLF occurs, and a shortMAC-I;
   determining according to the PCI of the cell where the RLF occurs, by the source eNB, all target eNBs where the terminal is supposed to locate;
   sending, by the source eNB, RLF information to the all target eNBs, wherein the RLF information comprises: the PCI of the cell where the RLF occurs, the C-RNTI allocated for the terminal in the cell where the RLF occurs, the shortMAC-I, and an ECGI of a cell to which the RRC reestablishment is attempted;
   receiving, by one of the all target eNBs, the RLF information;
   determining according to the received PCI, by the one of the all target eNBs, one or more cells where the terminal is supposed to locate, wherein the one or more cells is under the coverage of the one of the all target eNBs;
   determining, by the one of the all target eNBs, whether the received C-RNTI is possessed of by one of the one or more cells where the terminal is supposed to locate;
   in the case it is determined the received C-RNTI is possessed of by one of the one or more cells where the terminal is supposed to locate, determining, by the one of the all target eNBs, a key and an integrity protection algorithm according to the received C-RNTI;
   inputting, by the one of the all target eNBs, the received PCI, C-RNTI and ECGI into the integrity protection algorithm, as well as using the key, to calculate a shortMAC-I;
   determining, by the one of the all target eNBs, whether the calculated shortMAC-I is identical to the received shortMAC-I;
   in the case the calculated shortMAC-I is identical to the received shortMAC-I, determining, by the one of the all target eNBs, that the terminal locates in the one of the one or more cells;
   otherwise, determining that the terminal does not locate in the one of the one or more cells.

2. The method according to claim 1, further comprising:
   in the case it is determined the received C-RNTI is not possessed of by the one of the one or more cells where the terminal is supposed to locate, determining, by the one of the all target eNBs, that the terminal does not locate in the one of the one or more cells.

3. The method according to claim 1, wherein the source eNB is selected by the terminal via a cell selection procedure.

4. The method according to claim 1, further comprising:
   after it is determined the terminal locates in the one of the one or more cells, determining according to information of a last handover of the terminal, by the one of the all target eNBs, a handover scenario of the last handover; and
   notifying an eNB corresponding to the last handover of a result of the determining, so that the eNB corresponding to the last handover can automatically perform an optimization of a handover parameter according to the received result of the determining.

5. An eNB supporting terminal identification, being arranged to:
   when serving as a source eNB,
      receive an RRC reestablishment message from a terminal to which an RLF occurs, wherein the RRC reestablishment message comprises: a C-RNTI allocated for the terminal in a cell where the RLF occurs, a PCI of the cell where the RLF occurs, and a shortMAC-I;
      according to the PCI of the cell where the RLF occurs, determine all target eNBs where the terminal is supposed to locate; and
      send RLF information to the all target eNBs, wherein the RLF information comprises: the PCI of the cell where the RLF occurs, the C-RNTI allocated for the terminal in the cell where the RLF occurs, the shortMAC-I, and an ECGI of a cell to which the RRC reestablishment is attempted;
   when serving as a target eNB,
      receive the RLF information;
      according to the received PCI, determine one or more cells where the terminal is supposed to locate, wherein the one or more cells is under the coverage of the target eNB;

determine whether the received C-RNTI is possessed of by one of the one or more cells where the terminal is supposed to locate;

in the case it is determined the received C-RNTI is possessed of by one of the one or more cells where the terminal is supposed to locate, determine a key and an integrity protection algorithm according to the received C-RNTI;

input the received PCI, C-RNTI and ECGI into the integrity protection algorithm, as well as use the key, to calculate a shortMAC-I;

determine whether the calculated shortMAC-I is identical to the received shortMAC-I;

in the case the calculated shortMAC-I is identical to the received shortMAC-I, determine that the terminal locates in the one of the one or more cells;

otherwise, determining that the terminal does not locate in the one of the one or more cells.

6. The eNB according to claim 5, wherein the eNB is further arranged to:

when serving as the target eNB, in the case it is determined the received C-RNTI is not possessed of by the one of the one or more cells where the terminal is supposed to locate, determine that the terminal does not locate in the one of the one or more cells.

7. A system for identifying a terminal, comprising a terminal, and the eNB according to claim 6, wherein there are multiple eNBs, comprising a source eNB and one or more target eNBs, wherein the terminal is arranged to send, after an RLF occurs to the terminal, an RRC reestablishment message to the source eNB selected via a cell selection procedure, wherein the RRC reestablishment message comprises: a C-RNTI allocated for the terminal in a cell where the RLF occurs, a PCI of the cell where the RLF occurs, and a shortMAC-I.

8. A system for identifying a terminal, comprising a terminal, and the eNB according to claim 6, wherein there are multiple eNBs, comprising a source eNB and one or more target eNBs, wherein the terminal is arranged to send, after an RLF occurs to the terminal, an RRC reestablishment message to the source eNB selected via a cell selection procedure, wherein the RRC reestablishment message comprises: a C-RNTI allocated for the terminal in a cell where the RLF occurs, a PCI of the cell where the RLF occurs, and a shortMAC-I.

9. The eNB according to claim 5, wherein the eNB is further arranged to:

when serving as the target eNB, after it is determined the terminal locates in the one of the one or more cells, determine, according to information of a last handover of the terminal, a handover scenario of the last handover, and notify an eNB corresponding to the last handover of a result of the determining, so that the eNB corresponding to the last handover can automatically perform an optimization of a handover parameter according to the received result of the determining.

10. A system for identifying a terminal, comprising a terminal, and the eNB according to claim 9, wherein there are multiple eNBs, comprising a source eNB and one or more target eNBs, wherein the terminal is arranged to send, after an RLF occurs to the terminal, an RRC reestablishment message to the source eNB selected via a cell selection procedure, wherein the RRC reestablishment message comprises: a C-RNTI allocated for the terminal in a cell where the RLF occurs, a PCI of the cell where the RLF occurs, and a shortMAC-I.

11. A system for identifying a terminal, comprising a terminal, and the eNB according to claim 5, wherein there are multiple eNBs, comprising a source eNB and one or more target eNBs, wherein the terminal is arranged to send, after an RLF occurs to the terminal, an RRC reestablishment message to the source eNB selected via a cell selection procedure, wherein the RRC reestablishment message comprises: a C-RNTI allocated for the terminal in a cell where the RLF occurs, a PCI of the cell where the RLF occurs, and a shortMAC-I.

\* \* \* \* \*